Figure 12A:
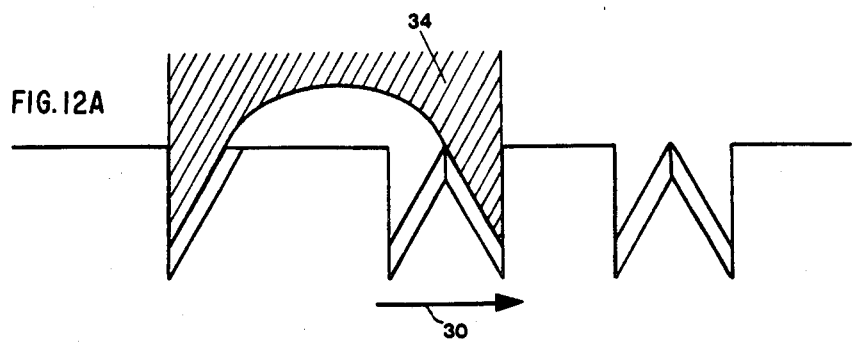

United States Patent [19]

Danielsson

[11] Patent Number: 4,624,053

[45] Date of Patent: Nov. 25, 1986

[54] SAW

[75] Inventor: Mats Danielsson, Sandviken, Sweden

[73] Assignee: Santrade Ltd., Lucerne, Switzerland

[21] Appl. No.: 816,302

[22] Filed: Jan. 6, 1986

Related U.S. Application Data

[62] Division of Ser. No. 578,367, Feb. 7, 1984, abandoned.

[30] Foreign Application Priority Data

Feb. 7, 1983 [SE] Sweden .................... 8300611

[51] Int. Cl.⁴ .................... B23D 45/00; B27B 5/29
[52] U.S. Cl. .................... 30/166 R; 76/112
[58] Field of Search .................... 30/166 R; 76/112

[56] References Cited

U.S. PATENT DOCUMENTS 813,371   2/1906   Fleming .
2,603,251 7/1952   Christenson .
3,208,310 9/1965   Dunn .
3,276,491 10/1966  Dunn et al. .
4,453,431 6/1984   Hollingsworth .

Primary Examiner—Frederick R. Schmidt
Assistant Examiner—Joseph T. Zatarga
Attorney, Agent, or Firm—Burns, Doane, Swecker & Mathis

[57] ABSTRACT

A saw has a plurality of generally V-shaped teeth formed by punching. The sides of each tooth define cutting edges. A bevel extends along each cutting edge. The bevels are formed by punching with a tool having a surface oriented non-perpendicular to the saw blank. Burrs formed during the punching step are not removed, but are allowed to remain to enhance the cutting ability of the teeth.

1 Claim, 14 Drawing Figures

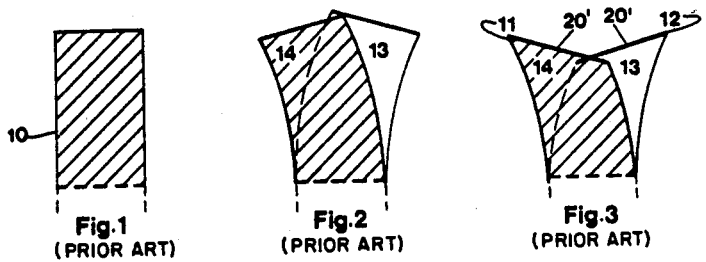
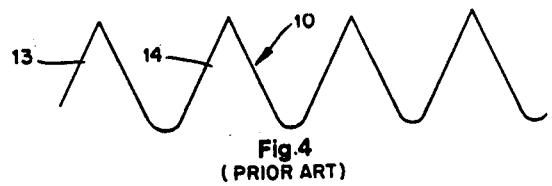
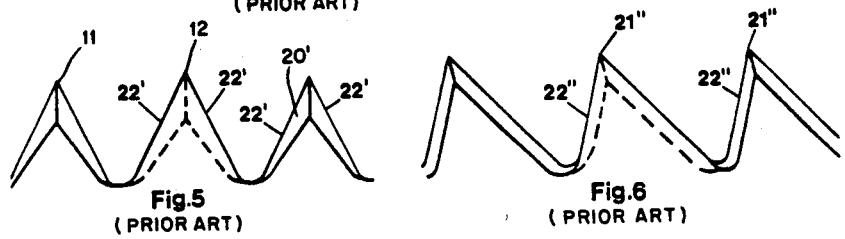
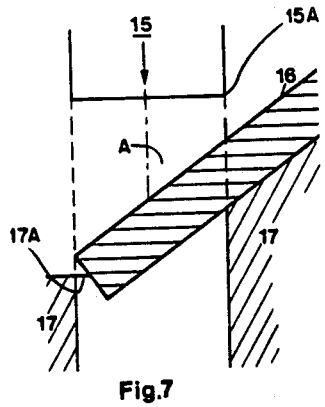
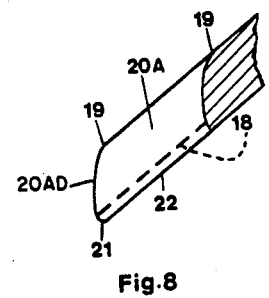
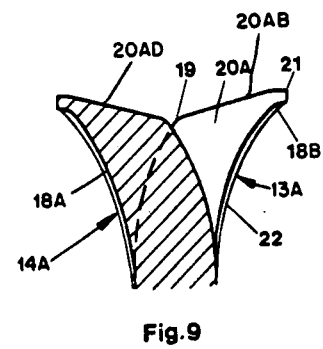

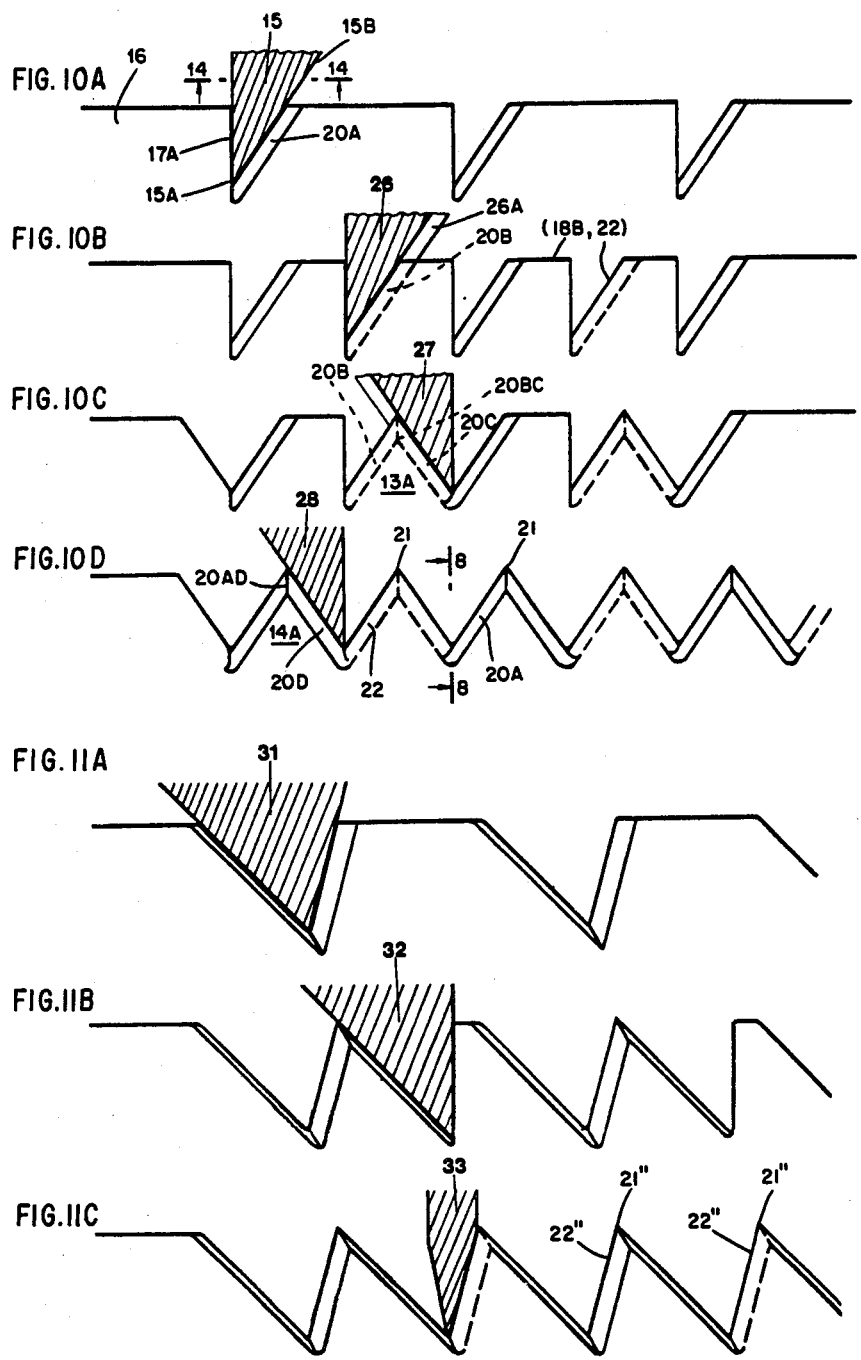

SAW

This application is a division, of application Ser. No. 578,367, filed Feb. 7, 1984 now abandoned.

BACKGROUND

Saws for cross-cut sawing of wood are preferably made with set teeth, the front edge and/or rear edge of which is beveled in such a way that the outer point of the tooth is the part which first contacts the wood. This renders it easy to remove the wood that lies between the outer left and outer right tooth points and the force for sawing becomes small.

Traditionally this has been achieved in two known ways. Either the contour of the teeth has been punched or ground perpendicularly to the surface of the saw blade, and the bevels have been produced by filing or grinding in a subsequent operation, or the contour and bevels have been made simultaneously, in which case it has been necessary to subdivide the grinding into several, at least two, operations, as the bevels on right hand teeth and left hand teeth have different direction.

The prior art punching operations result in the creation of a burr along each cutting edge, which burrs are thereafter removed during the grinding steps.

A prior art method is depicted in FIGS. 1–5, wherein a blank 10 is punched to form a series of teeth 13, 14 (FIG. 2), and is thereafter ground to form sharp edges 22', points 11, 12, and bevels 20'.

Punching has great advantages as a production method, as the same tool can be used for different sizes of teeth, and as it is easy to automatize the method. A further wish which can be fulfilled is to render it possible to perform tooth shaping and setting of saw blanks in strip form before cutting into pieces. The method is, however, not limited to straight saws but is also applicable for circular saws.

PURPOSE OF THE INVENTION

The purpose is to manufacture saws having beveled teeth by means of punching without subsequent filing or grinding. This is achieved by punching with a punching tool which moves in an oblique angle in relation to the surface of the saw.

A further purpose is to provide a saw having burrs along the cutting edge which increase the cutting effectiveness.

Closer details of the invention appear from the following specification with drawings according to the follow:

FIG. 1, a section of a saw blank manufactured according to earlier technique by punching or grinding.

FIG. 2, a section without bevels after setting the saw in FIG. 1.

FIG. 3, a section with bevels after setting the saw in FIG. 1.

FIG. 4, a side view of the saw in FIG. 1.

FIG. 5, a side view of the saw in FIG. 3.

FIG. 6, a side view of the saw in FIG. 3 in another design.

FIG. 7, a punching step in the manufacture of a saw according to the invention.

FIG. 8, cross-section through the bottom of a tooth gap in the saw taken along line 8—8 in FIG. 10A.

FIG. 9, cross-section through a tooth point in the saw after punching according to FIGS. 10A–10D.

FIGS. 10A–10D, successive phases of manufacture according to the invention wherein a series of punches pass through a blank to form symmetrical teeth.

FIGS. 11A–11C depict successive phases of manufacture according to the invention of a saw having unsymmetrical teeth, as shown in FIG. 6.

FIGS. 12A,B and 13A,B depict successive phases of the manufacture of the same saws as in FIGS. 10 and 11 with a different type of punching tool.

Figure 14:
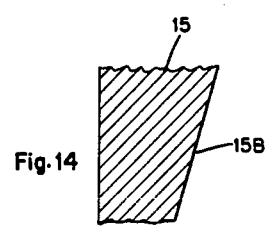

FIG. 14 is a vertical sectional view taken through a punch along line 14–14 in FIG. 10A.

DESCRIPTION OF THE INVENTION

FIGS. 1–3, which are sections of a saw through the point of a tooth, show the above-described conventional procedure for manufacture of a saw by means of punching and subsequent grinding or only grinding. After shaping the teeth 13 and 14, they are set to the form shown in FIG. 2 and thereafter ground to the shape shown in FIG. 3 with tooth points 11 and 12, bevels 20, and sharpened cutting edges 22' (FIG. 5). Burrs which are formed along the cutting edges by the punching step are removed by the subsequent grinding. If desired, the setting can be done after grinding.

FIGS. 5 and 6 show side views of two different types of saws which can be manufactured either by the conventional methods or by the method according to the invention.

FIG. 7 shows the method according to the invention. A punching tool 15 is pressed through the edge of the saw blank 16 past a die 17 on which the saw rests during the punching.

FIG. 10A shows a first punch 15 passing through the blank 16, the punch 15 being aligned with a triangular opening in the die 17 having a triangular edge 17A. The punch passes through the blank in a direction which forms an angle A relative to the plane of the blank as viewed in FIG. 7. Also, one side surface 15B of the punch is oriented nonperpendicularly relative to the plane of the blank as can be seen in FIG. 14, so that a first bevel 20A is produced during the punching step. Also, a burr 18A (FIG. 9) is formed along the downstream edge of the bevel, i.e., on the edge of the bevel 20A at which the punch passes out of the blank 16. Such burr 18A is not visible in FIGS. 10A–D. Next, a second punch 26 (FIG. 10B) is passed through the blank 16 from the opposite or second side of the blank. The second punch 26 includes a surface 26A which forms a second bevel 20B in the same manner that the surface 15B forms the first bevel. Note that the punch 26 is traveling through the plane of the paper in a direction toward the viewer, whereas the first punch 15 travels away from the viewer in FIG. 10A. A burr 18B is formed along the edge of the second bevel edge. Next, a third punch 27 is passed through the blank from said opposite side, i.e., from the same side as the second punch 26, to form a third bevel 20C which intersects the second bevel along a line 20BC, and end of which line defining a point 21. Next, a fourth punch 28 is passed through the blank from the first side, i.e., in the same direction as the first punch 15, to form a fourth bevel 20D which intersects the first bevel 20A along a line 20AD. As a result, generally V-shaped teeth 13A, 14A are formed. The saw is then set, i.e., the thus-formed teeth 13A, 14A are displaced toward opposite sides, as depicted in FIG. 9.

FIG. 8 shows a section through the bottom of a tooth gap in the saw 16 in the same position as in FIG. 7. FIG.

9 shows a section through the point of a tooth, the figure being orientated in the same way as FIG. 3.

It is earlier known that the front side and the rear side of a tooth must be punched in different operations in order to render the point sharp, also when punching perpendicularly to the saw blade. When punching according to the invention, a punch burr 18 arises on the side which rests on the stationary punch die 17 and a rounding 19 on the side which comes in contact with the movable part 15 of the punch. The punch burr 18 becomes larger for oblique punching than for perpendicular and becomes moreover substantially harder than the rest of the tooth due to the great local deformation. According to the invention, the punching is subdivided into several operations in such a way that bevels 20A,B having the proper direction are obtained and that the punch burrs 18A,B contribute to the sharpness of the saw at the tooth point 21 and along the cutting tooth edges 22, which are the fore edge of the tooth for saws working in one direction and of both edges for saws working in both directions.

In order to achieve this the punch burr should lie on the outside when cutting tooth edges 22 and at the outer side of the last punched edge at the point 21 of the tooth. This can also be so expressed that the fore edge of each tooth is formed by a punch tool which hits the saw blank on the side which, after setting, comes closest to the middle plane of the saw, or that each tooth point is formed by two punching operations of which the later is performed with a punching tool which hits the saw blade on the side which after setting comes closest to the middle plane of the saw.

FIG. 7 shows the punching direction inclined by angle A in the transverse direction of the saw, but of course, the punching direction can be inclined also in the longitudinal direction of the saw. The punching direction can thus be inclined (i) only in the longitudinal direction, (ii) only in the transverse direction or (iii) in both directions at the same time. The choice of inclination directions and angles depends on what shape is desired for the bevels of the teeth.

The path of the punching tool is suitably straight or substantially straight. The path could, for instance, be circular with a great radius, the short part of the path where the punching occurs being practically straight.

Performance: In FIG. 10-13 various types of punching procedures have been illustrated. It is presupposed that when the bevel is drawn with a full line, the punch moves downwards, and when the bevel is drawn with a broken line, the punch moves upwards in relation to the plane of the picture. In FIGS. 10A-D the blank is depicted as being disposed in the plane of the paper and thus it will be understood that the punch extends at an angle less than 90 degrees relative to the plane of the paper as per FIG. 7.

For saws which are intended to saw in the same way in both directions (FIG. 5) the punching is subdivided in four operations (FIG. 10), each of which may include several teeth. The operations are: right fore edge with punch 25, left fore edge with punch 26, left rear edge with punch 27 and right rear edge with punch 28. The sequence of the operations is without importance. The same punch may be used for two or more different operations by turning the punch and/or the saw blade.

For saws which are intended to saw preferably in one direction (FIG. 6) it can be accepted that the rear or trailing edge gets a small bevel and a burr edge on the side opposite to the point and the fore or leading edge. The punching can then be done in three operations (FIG. 11): the right fore edge together with the left rear edge with punch 31, the right rear edge with punch 32 and the left fore edge with punch 33. The sequence may also here be varied, but the operation that produces two edges (11A) may not be performed last.

Figure 12B:
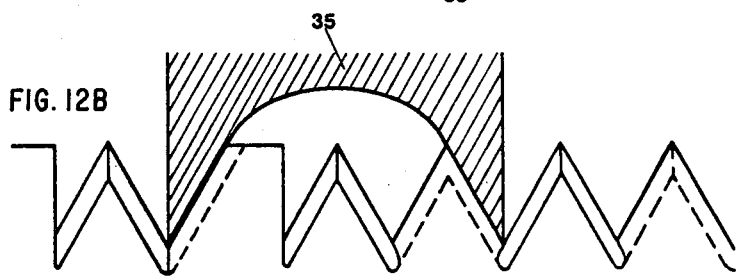
Figure 13A:
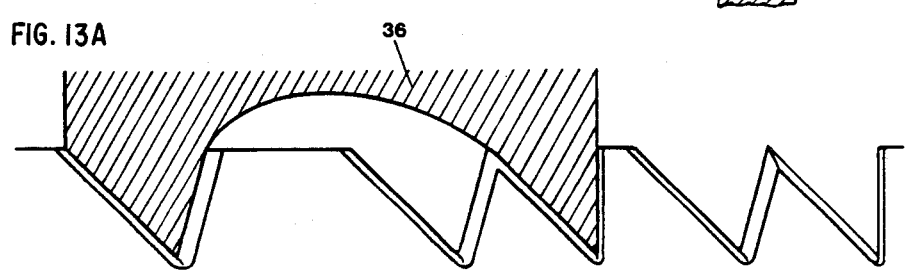
Figure 13B:
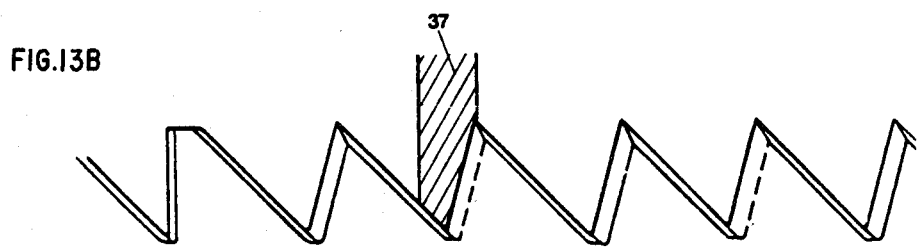

The chronological order relates to the order of the successive forming of a group of two adjacent teeth. By using multi-step (sequential) tools, where the saw blade between each punching operation is moved a distance shorter than the length of the punch in the direction of the saw tooth line, two operations which are made from the same side can be combined in the same punch tool (FIGS. 11 and 12), the saw blade being stepwise fed through two punching machines of which at least one performs two operations. FIGS. 12A and 13A show punching from above with punch 34 and 36, respectively, and FIGS. 12B and 13B show punching from below with punch 35 and 37, respectively. The arrow 30 shows the direction in which the blade is fed. When using such multi-step tools it is possible also to include the setting operation in the same punching tool. This can be done by attaching a setting hammer at the rear part of the punching tool, suitably with a resilient fastening.

The punching tool can also be designed in such a way that it performs the same operation on several equally positioned teeth simultaneously, after which the saw blade is moved forwardly a distance corresponding to the length of a group of teeth.

What is claimed is:

1. A saw comprising a series of punch-formed generally V-shaped teeth of substantially the same height, alternating ones of said teeth displaced outwardly in opposite directions, leading and trailing edges of said each tooth converging toward a point, at least said leading edge defining a cutting edge and being beveled, and a continuous punch burr formed along substantially the entire length of each cutting edge and projecting laterally from the plane of the tooth to facilitate penetration of the saw through material being cut.

* * * * *